United States Patent [19]

Hapgood

[11] 4,063,545

[45] Dec. 20, 1977

[54] SOLAR COLLECTOR THERMOSTAT

[75] Inventor: William H. Hapgood, Concord, Mass.

[73] Assignee: Raytheon Company, Lexington, Mass.

[21] Appl. No.: 737,879

[22] Filed: Nov. 1, 1976

[51] Int. Cl.² ............................................. F24J 3/02
[52] U.S. Cl. .................................. 126/271; 126/270; 237/1 A; 165/11
[58] Field of Search ............... 126/270, 271; 237/1 A; 219/449, 450, 546; 165/18, 11, 39, 107; 73/362.1, 362.3, 431, 343 R, 362.8, 355 R

[56] References Cited

U.S. PATENT DOCUMENTS

| | | | |
|---|---|---|---|
| 1,888,620 | 11/1932 | Clark | 126/271 |
| 2,553,302 | 5/1951 | Cornwall | 126/271 |
| 3,996,919 | 12/1976 | Hepp | 126/271 |

Primary Examiner—Kenneth W. Sprague
Assistant Examiner—James C. Yeung
Attorney, Agent, or Firm—Harold A. Murphy; Joseph D. Pannone; John T. Meaney

[57] ABSTRACT

A solar energy collector having therein a solar energy-absorbing panel in thermally-conductive relation to fluid conduits through which fluid is urged by an electrically controlled pump, and a thermostat associated with the collector and arranged to detect panel temperature as unaffected by the temperature of the fluid and operable to control activation of the pump in response to variations in temperature of the unaffected panel.

12 Claims, 6 Drawing Figures

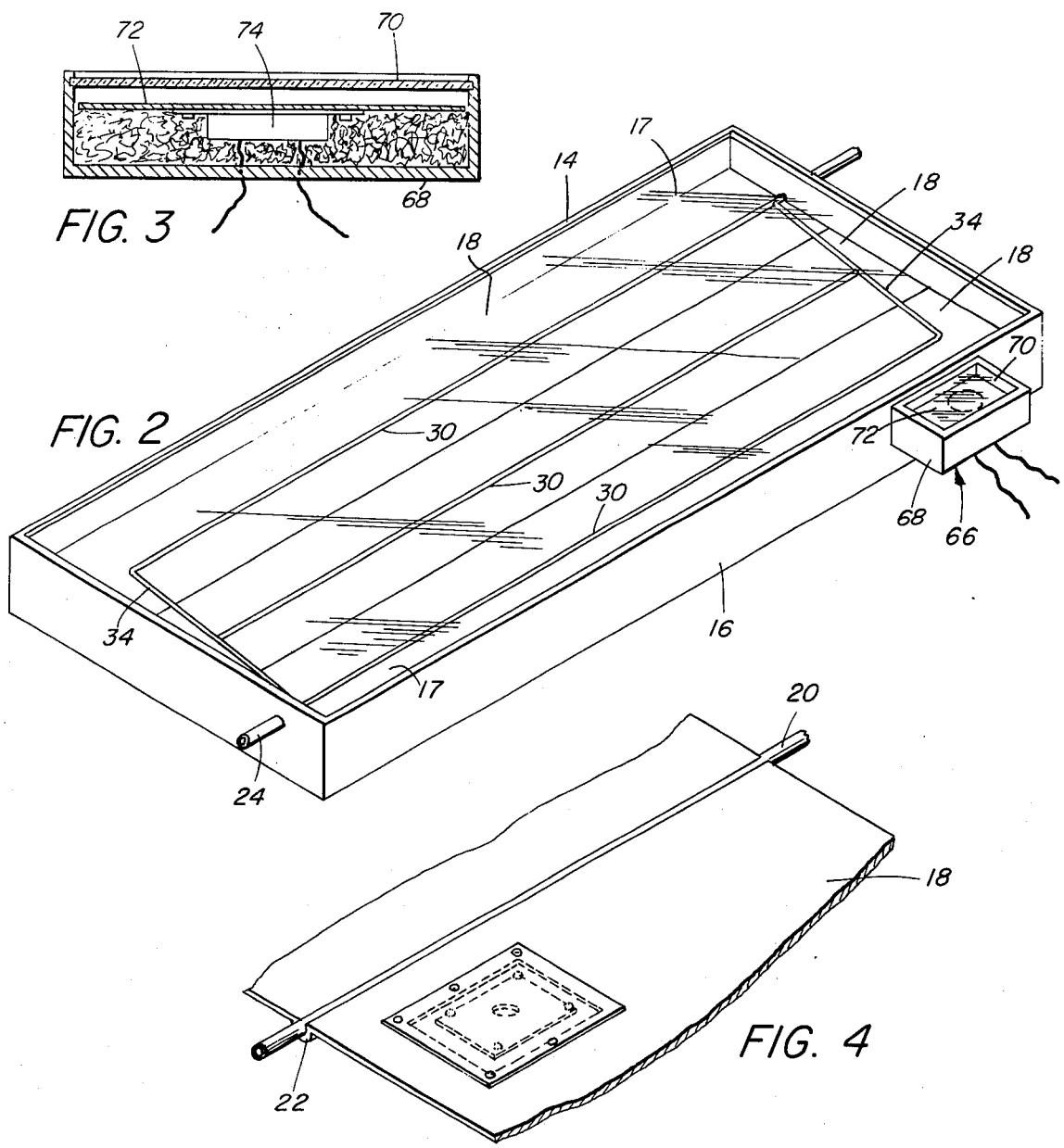
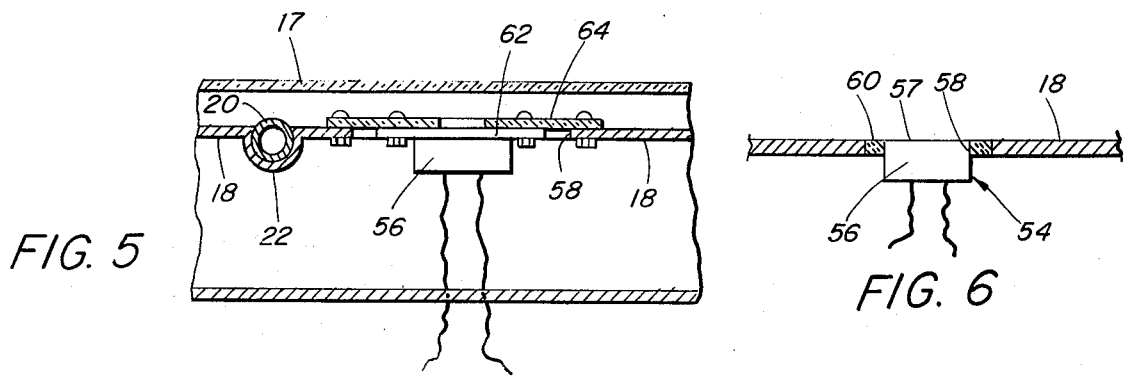

SOLAR COLLECTOR THERMOSTAT

BACKGROUND OF THE INVENTION

Solar energy collectors of one conventional type are provided with solar energy absorbing panels disposed to be impinged by solar radiation and to absorb heat therefrom. Such heat is transferred to a fluid such as water which is circulated through piping located in thermally conductive relation to the panels. The fluid is conveniently forced through the piping circuit by an electrically controlled pump and thus the heat from the panels is absorbed by the fluid and eventually stored within a suitable storage tank into which the heated fluid is conveniently directed.

It is undesirable, of course, that the pump be used to pump fluid through the system when the panels are not heated such as, for example, at night or in daytime when solar radiation is unable to reach the panels in sufficient quantity to adequately raise their temperature. Accordingly, thermostats have been employed to detect the temperature of the collector and to turn the pump on and off in response to the collector temperature. Thus the pump can be made to operate only when heat is available from the collector. This is a function of the incident solar energy and the outdoor ambient temperature, and whenever these two parameters are such that the collector is substantially above the temperature of thermal storage, then useful heat is available.

In known instances where the temperature of the collector's absorbing panel is used as the criteria for determining whether a pump should be operated or shut off, it was found that many times the pump would be operated unnecessarily because of the close differential which is provided. A very small amount of solar input will increase the temperature of a panel by 50° Fahrenheit or more, for example. However, the amount of heat that ia available in a collector whose equilibrium temperature is only a few degrees above storage is not enough to warrant running the collector pump.

For turning on a collector pump in the morning, for example, a simple thermostat measuring the collector temperature itself would be adequate, and a setting of up to 50° over storage temperature would give a good compromise between picking up all available heat and running the collector pump more than necessary. However, once cold water is ciruclating in the collector, the collector temperature will drop and cause the pump to cycle off, since collector temperature was used for the measurement and switching point.

SUMMARY OF THE INVENTION

The above and other disadvantages of the prior art are overcome by the invention wherein means is provided for measuring or sensing the temperature that the collector would assume with no water in it, this being termed the unloaded temperature. This will essentially integrate the effect of solar input and ambient temperature, and will produce a reliable control signal.

This control signal can be developed in two ways. An actual miniaturized collector without water piping and just large enough to support the thermostat and minimize edge losses may be used. Such a miniature collector is adapted to be positioned in a location representative of the collector array and can be used with any collector array as long as its glazing and radiation-absorbing surface match those of the collectors. This miniature collector will provide the required control signal under loaded collector conditions.

Alternatively, the thermostat may be integrated into a collector itself in a manner whereby it can sense unloaded panel temperature. This may be done in many ways such as by providing a thermostat with a heat-sensing surface having radiation-absorbing characteristics similar to the panel of the collector. The thermostat heat-absorbing surface may be on the thermostat housing itself, or may be a disc affixed to the thermostat and secured to the panel in a manner whereby heat will not be conducted between the panel and the disc. In the latter case the disc may be of plastic provided with a blackened heat-absorbing surface and having a small opening through it whereby the heat-sensing or absorbing surface of the thermostat will be exposed directly to solar radiation. The thermostat then may be inserted in a hole in the collector panel and supported therein by securing edge portions of the plastic disc to adjacent edge portions of the panel as by riveting or the like.

In such structures the thermostat is heat-insulated from the solar radiation-absorbing panel, and therefore, will not be affected by the circulating water.

BRIEF DESCRIPTION OF THE DRAWINGS

The above and other objectives and advantages of the invention will become apparent from the following description taken in connection with the accompanying drawings, wherein;

FIG. 2 is an isometric view of a solar collector having a heat-sensing device associated therewith in accordance with and having a thermostat device in accordance with one embodiment of the invention associated therewith;

FIG. 3 is a horizontal sectional view through the thermostat device shown in FIG. 2;

FIG. 4 is an isometric view of a solar radiation-absorbing panel showing a heat-sensing thermostat associated directly therewith in accordance with a second embodiment of the invention;

FIG. 5 is an enlarged fragmentary horizontal sectional view through a portion of a collector showing the heat-sensing thermostat device of FIG. 4 in position of use; and FIG. 6 is a fragmentary horizontal sectional view of a portion of a radiation-absorbing panel showing a thermostat device supported in an opening in the panel.

DESCRIPTION OF THE PREFERRED EMBODIMENTS

Figure 1:
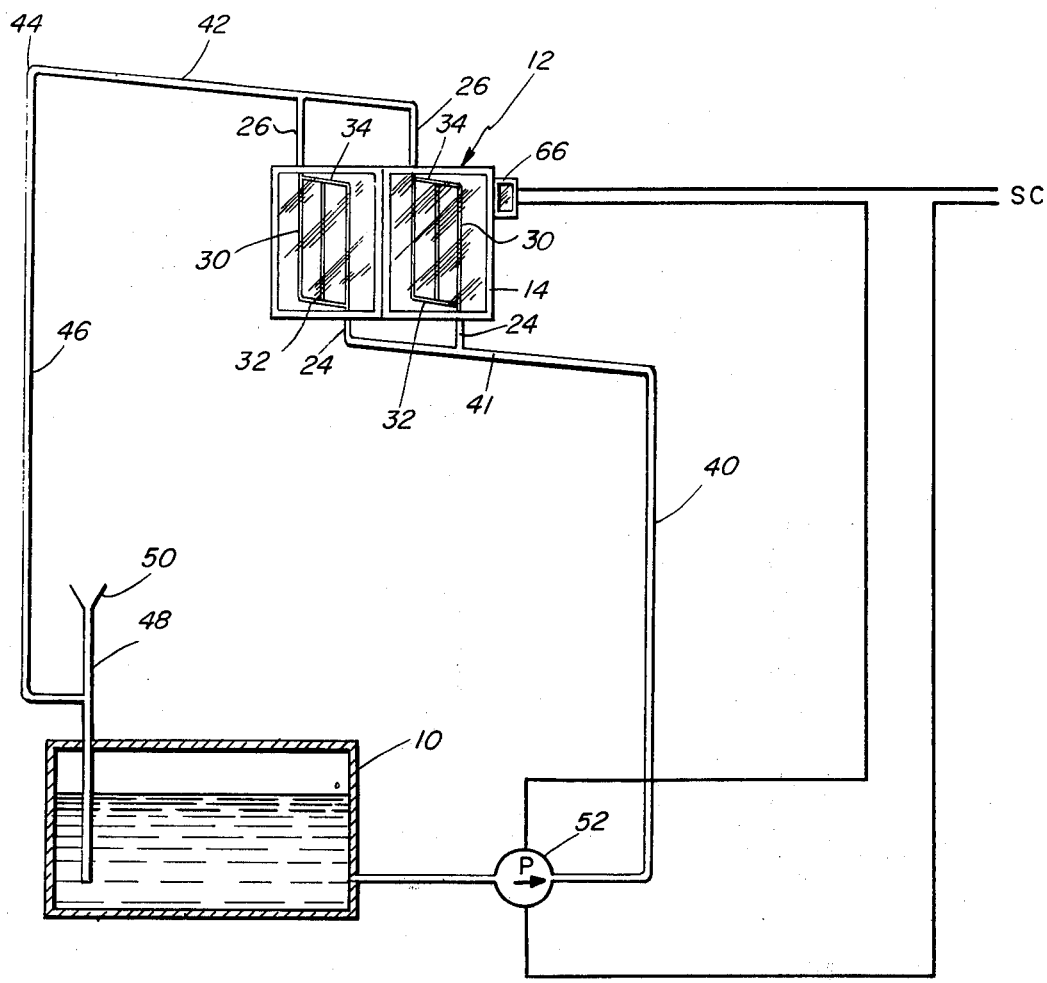
FIG. 1 is a diagrammatic illustration of a solar energy water-heating system embodying the invention.

Referring more particularly to the drawings wherein like characters of reference designate like parts throughout the several views, the system shown in FIG. 1 includes a storage tank or reservoir 10 in which is the supply of water to be heated by the array 12 of solar collectors 14. The tank 10 is preferably located within an enclosure or building where it normally will not be subjected to freezing temperatures. The collector array 12 will be located in any desired position where it will be impinged by solar radiation, such as on the roof of a building or on the ground adjacent the building containing the tank 10.

The tank 10 may be a plastic, concrete, metal or other enclosure within which the water is retained. Each collector 14 is of basically conventional structure such as disclosed, for example, in U.S. Pat. No. 3,898,979, with modifications to be described.

Each collector 14 comprises an enclosure 16 (FIG. 2) closed at the top by a transparent glazing 17. Within the enclosure 14 is an absorber plate or panel 18 upon which solar radiation is made to impinge after passing through the glazing 17. Upon or within the plate 18 is disposed an interconnecting grid 20 of pipes through which water is made to flow, as will be described hereinafter. Any suitable means may be employed for locating the grid pipes 20 in efficient heat-conductive relation to the absorber plate 18 such as shown, for example, in FIG. 5 wherein the plate 18 is provided with grooved portions 22 within which the pipes are enclosed. Thus, when the absorber plate 18 becomes heated by solar radiation, the heat is transferred from the plate through the walls of the pipes 20 to the water within the pipes.

The collectors 14, which may be of structural designs other than that described herein, are usually inclined to the horizontal so as to more efficiently intercept a maximum amount of solar radiation. The grid of pipes 20 in the described embodiment is made to extend upwardly from a low point to a high point. For example, as shown in FIG. 1, the lower end of the grid 20 is at the bottom end of each enclosure 16 and is connected to an inlet pipe 24, and the upper end of the grid 20 is at the upper end of the enclosure and is connected to an outlet pipe 26. All piping within the enclosure is pitched upwardly so that normally any water in the grid piping will flow downwardly out of end 24 unless urged in the upward direction by means such as a pump, as will be described.

The grid 20 may comprise several pipes interconnected in any suitable fashion and may comprise, for example, a plurality of vertically extending substantially parallel pipes 30 (FIG. 2), all of which in a collector are connected at their lower ends to a common horizontally extending pipe 32. At their upper ends all of the vertically extending pipes in a collector 30 are connected to a common horizontally extending pipe 34. Both horizontal pipes are inclined as shown, with the lower end of lower pipe 32 being connected to an inlet pipe 24 and the upper end of upper pipe 34 being connected to an outlet pipe 26. Thus, water throughout the grid 20 will tend to flow downwardly to inlet pipe 32 unless forced in the opposite direction.

The array 12 is supplied with water from tank 10 through a feed pipe 40 which is connected to the inlet pipe 24 of each collector 14 by a common inclined pipe 41. The outlet pipes 26 of the collectors are each connected to an upwardly inclined pipe 42 which is in turn connected at point 44 to a return pipe 46 which extends downwardly to the tank 10. A standpipe 48 is connected at its lower end to return pipe 46 at a point near the tank and is provided with a vent 50 at its upper end.

A pump 52 is connected into the feed pipe 40 near the tank, and functions to force water upwardly through the feed pipe 40, inclined pipe 41, and inlet pipes 24 into the grids 20, and then upwardly out of the grids through outlets pipes 26 and inclined pipe 42 to the return pipe 46.

While the water is flowing through the grids 20 it will absorb and be warmed by the heat from the collectors 14. This warmed water will be returned through return pipe 46 to the tank for subsequent recirculation.

More details of the piping circuit shown and described may be obtained from copending U.S. patent application Ser. No. 727,067, filed Sept. 27, 1967, and owned by the same assignee as the present invention. However, it is to be understood that other piping circuits may be employed which utilize an electrically operated pump to circulate water through the collectors.

In accordance with the present invention, control means is provided for operating the pump 52 only when adequate heat is available from the collectors 14. For example, if the collectors have heat which is about fifty degrees or more above the temperature of the water stored in the tank 10, this heat will be sensed by a suitable thermostatic device, to be described, which will operate to start the pump. This will cause the water from the storage tank 10 to be circulated through the collectors.

However, it will be apparent that such circulation of water at a temperature lower than that of the collectors will cause a resultant lowering of the temperature of the collectors, consequently resulting in less available heat. Thus, the pump will be shut off. This close differential control is not necessary and is undesirable, and requires additional complicated electrical devices and circuitry to prevent such shutting off of the motor.

In accordance with the present invention there is provided a novel thermostat device which measures or senses the temperature of a collector's absorbing panel in "unloaded" condition. By "unloaded" is meant the temperature of a collector with no water in it.

The thermostat device may take any of several forms. For example, it may be a conventional thermostat 54 mounted in a suitable can 56 (FIG. 6) wich has a surface 57 blackened or otherwise arranged to have thermal absorption characteristics similar to those of the absorber panel 18. The thermostat 54 is adapted to be mounted in an opening 58 which is provided in one of the panels or plates 18 as by a suitable thermally nonconductive sealer or cement 60. The thermostat 54 is mounted with its sensitive surface 57 disposed flush with the adjacent surrounding surface of the panel 18 so as to lie equidistant therwith from the overlying glazing 17. Thus, since no heat will be transmitted from the panel 18 to the surface 57 through the adhesive 60, the surface 57 will possess substantially the same identical heat absorption characteristics as the panel without being affected by any changes in panel temperature as a result of flow of water through the pipes 20. Therefore, the temperature of the thermostat surface will always be representative of the unloaded temperature of the panels.

In a second embodiment, the thermostat 56 shown in FIG. 5 is provided on its upper side with a plate 62 which has the desired thermal absorption characteristics similar to those of the panel 18. In this embodiment the thermostat is also mounted in an opening 58 in the panel 18 but instead of being cemented in place is attached to the area of the panel surrounding the opening 58 by a solar radiation transmissive plastic disc 64. Disc 64 is attached as by small rivets or bolts to the edge of the plate 62 with its peripheral edge portion spanning the encircling spaced portion of the opening 58 and being riveted or otherwise suitably fixed to the panel 18. Thus, the plate 62 is supported in the plane of the panel 18 and is provided with thermal absorption characteristics of an unloaded panel 18, that is, unaffected by temperature of water in pipes 20.

In a further embodiment, as shown in FIGS. 2, 3, and 4, the collector 14 has a miniature unloaded collector 66 located adjacent to it. For example, a small enclosure 68 having a glazing 70 thereover is affixed to a side of the enclosure 16 of one of the collectors 14. Beneath the glazing 70 and spaced below it is a miniature absorber panel 72. It will be noted that no fluid pipes are used in this miniature collector and that solar radiation will thus impinge upon and heat the small panel 72 as in the large collector 14.

A thermostat 74 is bolted, riveted, cemented or otherwise fixedly attached directly to the under side of the panel 74 and thus will be operatively responsive to variations in temperature of the panel 72. It will be understood that the small panel 72 will have the same thermal absorption characteristics as the large panel 17 but will not be affected by the temperature of any water flowing through the piping circuit. Therefore, the thermostat will constantly monitor the unloaded temperature of a panel 17 as represented by the small panel 72.

It will be apparent that with any of the thermostat devices described herein, constant monitoring of unloaded panel temperatures can be maintained so that pump operation will be properly controlled to cause flow of fluid at any time that suitable heat is available in a collector.

It will be apparent, however, that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. In a solar radiation collector having a radiationabsorbing panel with predetermined absorbing characteristics and piping means in thermally conductive relation with the panel for conducting fluid to be heated by thermal conduction from the panel, the combination therewith of a thermostat device comprising a thermostat having a surface area which possesses the same thermal absorpiton characteristics as the panel unaffected by the temperature of the fluid in the piping means.

2. In the combination set forth in claim 1, said thermostat being positioned within an opening in said panel with said surface area disposed substantially coplanar with the adjacent surrounding surface of the panel.

3. In the combination as set forth in claim 2, said surface area being disposed in thermally nonconductive spaced relation to the panel.

4. In the combination set forth in claim 3, said thermostat being supported on the panel by attachment means having low thermal conductivity.

5. In the combination set forth in claim 4, said attachment means being a cement.

6. In the combination set forth in claim 4, said attachment means being a plastic disc.

7. In the combination set forth in claim 3, said thermostat including a housing and said surface area comprising a surface of said housing.

8. In the combination set forth in claim 3, said surface area comprising a plate carried upon one side of said housing.

9. In the combination set forth in claim 8, said plate being disposed in thermally nonconductive spaced relation in the panel and mounted within said opening by an overlying disc of material transparent to solar radiation, said disc being attached to said plate, being of a size to span the space between the plate and surrounding portion of the panel, and being attached in a marginal area to said panel.

10. In a solar radiation collecting system, a main solar radiation collector having a radiation-absorbing panel with predetermined absorbing characteristics and piping means in thermally conductive relation with the panel for conducting fluid to be heated by thermal conduction from the panel, the combination therewith of a thermostat device comprising a miniaturized collector comprising an enclosure having an open upper side, a glazing closing said open side of the enclosure, a radiation-absorbing panel located within the enclosure beneath the glazing and having thermal absorption characteristics the same as those of the panel in the main collector unaffected by the temperature of the fluid in the piping means thereof.

11. In a system as set forth in claim 10, said miniaturized collector being mounted on one side of the main collector.

12. A system for heating water by solar radiation comprising at least one collector comprising an enclosure having an open upper side, a glazing on said open side of the enclosure, a radiation-absorbing panel positioned within the enclosure beneath the glazing and having predetermined radiation absorbing characteristics, piping means in thermally conductive relation with the panel for conducting fluid to be heated by thermal conduction from the panel, a storage tank containing fluid to be heated, a feed pipe connecting said tank to one end of said piping means, pump means for forcing fluid from the tank through the feed pipe and piping means, and a thermostat device operatively electrically connected to said pump means and including a surface area which possesses the same thermal absorption characteristics as said panel unaffected by the temperature of the fluid in the piping means and operable to turn on the pump means when the temperature of said surface area indicates a predetermined level of heat is available.

* * * * *